United States Patent [19]
Wilcox et al.

[11] 3,919,108
[45] Nov. 11, 1975

[54] METHOD OF PREVENTING DEGRADATION OF YTTRIUM OXIDE PHOSPHOR

[75] Inventors: Harold D. Wilcox, Elmira, N.Y.; Douglas A. Griswold, Blossburg, Pa.; Himanshu M. Patel, Horseheads, N.Y.

[73] Assignee: Westinghouse Electric Corporation, Pittsburgh, Pa.

[22] Filed: Nov. 14, 1974

[21] Appl. No.: 523,941

[52] U.S. Cl. ............... 252/301.3 R; 252/301.4 R; 117/33.5 C; 117/100 B
[51] Int. Cl.² ............................................ C09K 11/46
[58] Field of Search ............ 252/301.3 R, 301.4 R; 117/100 B, 33.5 C, 33.5 CM, 6 L

[56] References Cited
UNITED STATES PATENTS

| | | | |
|---|---|---|---|
| 2,647,066 | 7/1953 | Homer | 117/33.5 L |
| 3,522,071 | 7/1970 | Yokota et al. | 117/100 B X |
| 3,594,207 | 7/1971 | Allie et al. | 117/100 B X |
| 3,607,371 | 9/1971 | Haynes et al. | 117/100 B |
| 3,615,571 | 10/1971 | Griswold et al. | 117/33.5 C |
| 3,619,265 | 11/1971 | Hammond et al. | 117/100 B |
| 3,676,177 | 7/1972 | Hammond et al. | 117/33.5 CM |
| 3,684,546 | 8/1972 | Hammond et al. | 117/33.5 C |
| 3,690,929 | 9/1972 | Yokota et al. | 117/100 B |
| 3,707,396 | 12/1972 | Patel | 117/33.5 C |

*Primary Examiner*—Jack Cooper
*Attorney, Agent, or Firm*—W. G. Sutcliff

[57] ABSTRACT

A method of preventing degradation of yttrium oxide phosphor in an aqueous slurry containing photosensitive chromate ion. An ammonium polycarboxylate compound is added to the slurry to retard or eliminate chromate absorption by the phosphor.

3 Claims, No Drawings

METHOD OF PREVENTING DEGRADATION OF YTTRIUM OXIDE PHOSPHOR

BACKGROUND OF THE INVENTION

The present invention relates to the handling of yttrium oxide phosphor and more particularly to its use in fabricating color television picture tubes.

Yttrium oxide phosphor continues to be used as a red emitting cathodoluminescent material in color television picture tubes. The phosphor is a finely divided material which is selectively deposited on the picture tube faceplate from an aqueous slurry and fixed in place by a photo-resist process. In the highly automated high speed production process it is necessary to maintain a large volume of phosphor slurry. The slurry contains a photosensitive agent which contains chromate ion needed for the photo-resist processing.

A recurring problem in the industry is the well-known degradation of the efficiency of the yttrium oxide phosphor in the slurry over an extended time period. This is particularly a problem when the production line is shut down as over a weekend. The yttrium oxide in the presence of the water in the slurry, slowly is converted on the phosphor particle surface to yttrium hydroxide. The yttrium hydroxide is gelatinous and causes two problems; first, it absorbs chromate ion from the slurry and thereby reduces the light sensitivity of the slurry; and, second, the gelatinous consistency makes it difficult to wash off undesired coating portions from the faceplate. This second difficulty can produce sticking of the red phosphor, which is the last phosphor deposited on a color screen, to the blue and green phosphor deposits producing what is termed cross-contamination, which shows up as poor color output in the final product.

The industry has sought to minimize this well-known problem by a variety of techniques. The earliest work consisted of providing a variety of coatings on the individual phosphor particles, which coatings act as a physical and/or chemical barrier preventing formation of the hydroxide and subsequent chromate ion absorption. Some of the coatings used are finely divided silica, germania, and also a fluoridization layer. The problem with such coatings is that the phosphor is typically subjected to numerous handling processes in preparing the slurry, such as ball milling the phosphor particles to achieve desired particle size, which degrade the coatings' effectiveness.

Another approach to handling this problem is to incorporate a buffering agent in the slurry to control the pH level to minimize hydrolysis and the subsequent phosphor degradation. The buffering agent used has typically been ammonium hydroxide, and the pH level is maintained basic at about pH 9 to 9.5. The ammonium hydroxide converts the standard ammonium dichromate photosensitize agent included in the slurry to normal chromate which is not absorbed by the phosphor. The use of this buffering agent does not prevent the formation of the sticky, gelatinous yttrium hydroxide surface layer on the individual phosphor particles.

A method of preventing hydroxide formation and chromate ion absorption is desired which is compatible with this complex chemically sensitive production process.

SUMMARY OF THE INVENTION

The addition of selected ammonium polycarboxylates to the slurry has been found to effectively prevent chromate absorption for long periods of time, and also to eliminate formation of the yttrium hydroxide surface layer. The preferred additive which is compatible with a polyvinyl alcohol polymerizable constituent aqueous slurry is ammonium oxalate in an amount of about 1 weight percent based on the phosphor weight.

DESCRIPTION OF THE PREFERRED EMBODIMENT

The test results which show the efficiency of the inventive method will now be set forth. A control slurry was prepared with uncoated, finely divided conventional yttrium oxide phosphor dispersed in water with conventional ammonium dichromate proportion included. The slurry was allowed to stand to establish the pot-life. Chromate absorption occurred in less than 8 hours.

Three other slurry mixtures were prepared which were identical to the control slurry except for the addition of respectively ammonium oxalate, ammonium citrate, and ammonium tartrate. The ammonium polycarboxylates were included in amounts of about 1 weight percent based on the phosphor weight contained in the slurry. The ammonium oxalate retarded chromate absorption for from 75–100 hours. The ammonium citrate also retarded chromate absorption for from 75–100 hours. The ammonium tartrate prevent chromate absorption for 350 hours.

In a color screen fabrication process the phosphor slurry is admixed with a photo-polymerizable material, such as polyvinyl alcohol, gelatin, casien. The polyvinyl alcohol is preferred, and the ammonium oxalate is highly compatible with this admixed slurry. The yttrium oxide is converted to yttrium oxalate which does not absorb chromate ion, and which also prevents hydroxide formation. The amount of ammonium polycarboxylate is governed by the solubility of the material. The oxalate, citrate, and tartrate are poorly soluble in the aqueous slurry, and at least about 0.5 weight percent addition based on the phosphor weight is necessary to insure that the material will be sufficiently solubilized for reaction with the yttrium oxide.

It has been found that the addition of ammonium hydroxide to control slurry pH is also compatible with the use of these ammonium polycarboxylates. Thus, to further insure against reaction of the yttrium oxide to the hydroxide it is desirable to also add sufficient ammonium hydroxide to the slurry to maintain the slurry pH at about 9 to 9.5.

The yttrium polycarboxylate surface layer on the oxide phoshor particles is readily oxidizable during the conventional lehring operation in which the partially fabricated but unsealed picture tube is heated to volatize constituents such as the polymerized polyvinyl alcohol, or other such organic readily volatile compounds. The resultant picture tube will thus have highly efficient yttrium oxide phosphor present as the red emitter.

We claim:

1. Method of preventing degradation of yttrium oxide phosphor in an aqueous slurry containing dichromate ion, which method comprises adding an ammonium polycarboxylate selected from the group consisting of ammonium oxalate, ammonium citrate and ammonium tartrate in an amount of at least 0.5 weight percent of the phosphor weight, to the slurry.

2. The method specified in claim 1, wherein said slurry includes polyvinyl alcohol and the polycarboxylate is ammonium oxalate in an amount of about one percent by weight of the phosphor weight.

3. The method specified in claim 1, wherein a pH level of between 9 and 9.5 is maintained by adding ammonium hydroxide to the slurry.

* * * * *